(12) United States Patent
Caine et al.

(10) Patent No.: US 8,868,343 B1
(45) Date of Patent: Oct. 21, 2014

(54) LOCATING PLACE OF LODGING ALONG A ROUTE

(71) Applicant: Priceline.com, Inc., Norwark, CT (US)

(72) Inventors: John Caine, Fairfield, CT (US); Michael Diliberto, Stamford, CT (US); Jonathan Taylor, Ridgefield, CT (US); Scott Lake, Bethel, CT (US)

(73) Assignee: priceline.com LLC, Norwalk, CT (US)

( * ) Notice: Subject to any disclaimer, the term of this patent is extended or adjusted under 35 U.S.C. 154(b) by 0 days.

(21) Appl. No.: 14/089,647

(22) Filed: Nov. 25, 2013

(51) Int. Cl.
*G01C 21/00* (2006.01)
*G01C 21/36* (2006.01)

(52) U.S. Cl.
CPC ........ *G01C 21/3682* (2013.01); *G01C 21/3679* (2013.01); *G01C 21/36* (2013.01); *G01C 21/00* (2013.01)
USPC ........................................... 701/527; 701/467

(58) Field of Classification Search
CPC ........... G01C 21/3679; G01C 21/3682; G01C 21/3644; G01C 21/3617; G01C 21/3614; G01C 21/00; G08G 1/0969; G06F 17/30
USPC ......... 701/527, 431, 408–410, 425, 426, 438, 701/453, 454, 532, 533, 540, 400, 467; 340/995.1, 995.2, 995.12, 995.23, 340/995.24
See application file for complete search history.

(56) References Cited

U.S. PATENT DOCUMENTS

| | | | |
|---|---|---|---|
| 5,664,110 A | 9/1997 | Green et al. | |
| 5,724,520 A | 3/1998 | Goheen | |
| 5,987,440 A | 11/1999 | O'Neil et al. | |
| 6,087,956 A | 7/2000 | Helferich | |
| 6,094,640 A | 7/2000 | Goheen | |
| 6,097,941 A | 8/2000 | Helferich | |
| 6,233,430 B1 | 5/2001 | Helferich | |
| 6,253,061 B1 | 6/2001 | Helferich | |
| 6,259,892 B1 | 7/2001 | Helferich | |
| 6,459,360 B1 | 10/2002 | Helferich | |
| 6,462,646 B2 | 10/2002 | Helferich | |
| 6,636,733 B1 | 10/2003 | Helferich | |
| 6,696,921 B2 | 2/2004 | Helferich | |
| 6,826,407 B1 | 11/2004 | Helferich | |
| 6,983,138 B1 | 1/2006 | Helferich | |
| 7,003,304 B1 | 2/2006 | Helferich | |
| 7,039,428 B1 | 5/2006 | Helferich | |
| 7,146,157 B2 | 12/2006 | Helferich | |
| 7,155,241 B2 | 12/2006 | Helferich | |
| 7,242,951 B2 | 7/2007 | Helferich | |
| 7,277,716 B2 | 10/2007 | Helferich | |
| 7,280,838 B2 | 10/2007 | Helferich | |
| 7,376,432 B2 | 5/2008 | Helferich | |
| 7,403,787 B2 | 7/2008 | Helferich | |

(Continued)

*Primary Examiner* — Marthe Marc-Coleman

(74) *Attorney, Agent, or Firm* — Hickman Palermo Truong Becker Bingham Wong LLP; Anjali Behal

(57) ABSTRACT

Techniques for locating places of lodging along a route and for displaying information relating to the places of lodging are described. A plurality of search points on a route are selected according to various selection techniques. Performance of a plurality of point searches is caused, where each point search of the plurality of point searches is associated with a respective search point of the plurality of search points and is a search for places of lodging near the respective search point. Search result information relating to at least some point searches of the plurality of point searches is displayed in association with route information relating to the route.

26 Claims, 12 Drawing Sheets

(56) References Cited

U.S. PATENT DOCUMENTS

| | | | |
|---|---|---|---|
| 7,627,305 B2 | 12/2009 | Helferich | |
| 7,835,757 B2 | 11/2010 | Helferich | |
| 7,843,314 B2 | 11/2010 | Helferich | |
| 7,957,695 B2 | 6/2011 | Helferich | |
| 8,099,046 B2 | 1/2012 | Helferich | |
| 8,107,601 B2 | 1/2012 | Helferich | |
| 8,116,741 B2 | 2/2012 | Helferich | |
| 8,116,743 B2 | 2/2012 | Helferich | |
| 8,134,450 B2 | 3/2012 | Helferich | |
| 8,195,569 B2 | 6/2012 | O'Neil et al. | |
| 8,224,294 B2 | 7/2012 | Helferich | |
| 8,295,450 B2 | 10/2012 | Helferich | |
| 8,355,702 B2 | 1/2013 | Helferich | |
| 8,374,585 B2 | 2/2013 | Helferich | |
| 8,386,479 B2 * | 2/2013 | Safra et al. | 707/723 |
| 2007/0093958 A1 * | 4/2007 | Jonsson et al. | 701/211 |
| 2012/0036229 A1 * | 2/2012 | Uyama et al. | 709/219 |
| 2012/0173144 A1 * | 7/2012 | Nesbitt | 701/527 |
| 2013/0166192 A1 * | 6/2013 | Pfeifle et al. | 701/410 |
| 2013/0166586 A1 * | 6/2013 | Pfeifle et al. | 707/769 |
| 2013/0173157 A1 * | 7/2013 | Bellesfield et al. | 701/533 |
| 2014/0025293 A1 * | 1/2014 | McQuaide, Jr. | 701/467 |

* cited by examiner

LOCATING PLACE OF LODGING ALONG A ROUTE

TECHNICAL FIELD

The present disclosure relates to techniques for locating places of lodging along a route and for displaying information relating to the places of lodging.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Users often need to locate places of lodging while traveling. For example, a user may need to locate a hotel while driving between cities or across the country. Current techniques for searching for places of lodging may comprise searching around a specified point and presenting the places that are determined to be within a particular radius from the specified point. Such a technique serves the interests of a stationary user quite well because one of his or her primary criteria for selecting a point of interest would be the distance of the place of lodging from a point of interest he wishes to be near.

However, when a user is traveling, especially when on a long journey, the traveling user's criteria for selecting a lodging place are quite different than a user that is stationary at a particular point. Techniques for searching for places of lodging along a route that take into account the needs of a traveling user are needed. Techniques for displaying the search result information in a manner that enables the user to the easily select the place of lodging are also needed.

SUMMARY OF THE INVENTION

The appended claims may serve as a summary of the invention.

DETAILED DESCRIPTION

Figure 1:
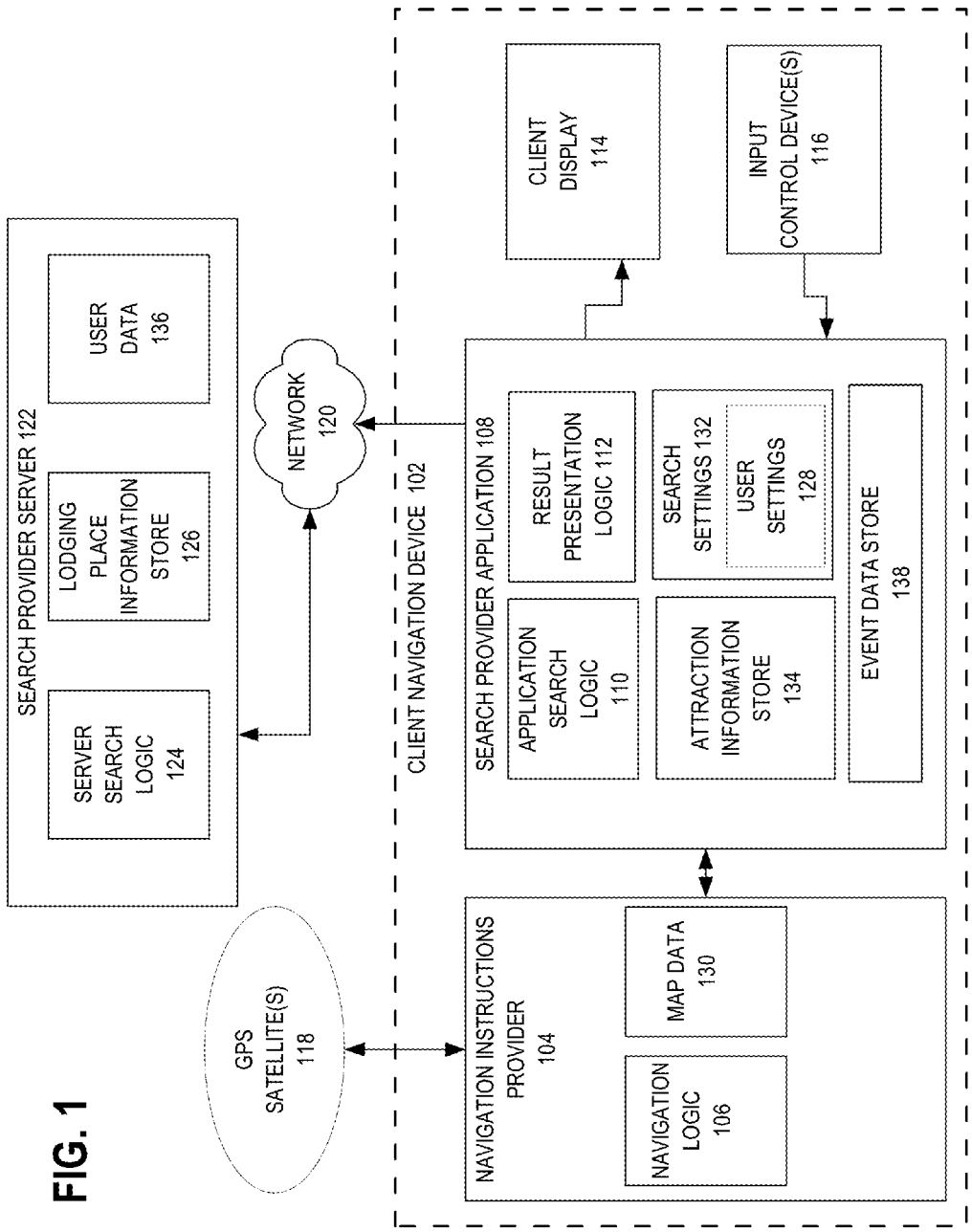
FIG. 1 illustrates an example networked data processing system that may be used to search for places of lodging along a route and to display search result information.

Techniques for locating places of lodging along a route and for displaying information relating to the places of lodging are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Structural and Functional Overview
        2.1 Example Data Processing System
        2.2 Example Processes for Locating Lodging Places and Displaying Lodging Information
            2.2.1 Selection of Search Points
            2.2.2 Display of Search Result Information
            2.2.3 Recommending Lodging Places Based on a Preferred Check-In Time
    7.0 Implementation Mechanisms—Hardware Overview
    8.0 Extensions and Alternatives
    1.0 General Overview Techniques for locating places of lodging along a route and for displaying information relating to the places of lodging are described. A starting point and a destination point are determined using a computer. A route of a journey by a mode of transportation from the starting point to the destination point is determined using the computer. A plurality of search points that are spaced apart and on the route are selected. Performance of a plurality of point searches are caused, wherein each point search of the plurality of point searches is associated with a search point of the plurality of search points and is a search for places of lodging that are near the search point. Search results of two or more of the plurality of point searches and identifying two or more places of lodging located along the route are received using the computer. Display of search result information in association with route information relating to the route is caused.

2.0 Structural and Functional Overview

Searching for places of lodging along a route may include performing a plurality of point-based searches ("point searches") that are based upon points on the route ("search points"). A place of lodging may refer to a hotel, motel, inn, bed and breakfast, hostel, truck stop, or other lodging facility with rooms available for reservation or purchase. Places of lodging along a route may include places that are on the route and near the route.

Particular points on the route may be selected as search points based in part on search settings, information about the route, and/or information about the user. For example, particular search points may be selected based on information including, but not limited to, significant turning points in the directions, a route segment length setting, a preferred stop time specified in the settings, and proximity to any of a set of attractions.

Search results of the point searches may be received. Each search result may correspond to a different lodging place. Preferred search points may be selected based at least in part on the search results. For example, a search point may be selected as a preferred search points based on a representative price of the search point, determined based on the price of the search results of a point search based around the search point. Alternatively or additionally, a search point is selected as a preferred search result based on the number of search results that result from the point search. Certain search points may also be selected as preferred search points based in part on how well the corresponding search results match with user preferences.

Search result information relating to at least some point searches may be displayed in association with route information relating to the route. For example, preferred search points that are determined to be optimal stopping points on the route may be automatically identified based on one or more of the technique described herein. Preferred search points may be highlighted, annotated, or otherwise emphasized on a graphical depiction of the route upon a geographical map.

As another example, preferred search points may be identified and presented to the user in association with navigation directions for navigating the route. The displayed search result information for a particular search point may identify the location of the search point and may comprise information about one or more places of lodging included as search results in a point search based around the search point. As another example, a plurality of places of lodging returned as search results may be selected and assigned price categories based on the prices of the places of lodging. For each of the one or more lodging places, the price category of the lodging place may be visually indicated in association with a location upon a geographical map that corresponds to the location of the place.

Thus, in an embodiment, a client navigation device may automatically identify points on the route that are determined to be optimal stopping points for the user based in part on information about the user and the availability of lodging places along the route. The client navigation device may display information identifying the optimal stopping points on the route and/or proposed nearby lodging places. Accordingly, a user may quickly review his best options for stopping points and easily chose a lodging place with minimal distraction from other tasks such as driving.

2.1 Example Data Processing System

FIG. 1 illustrates an example networked data processing system that may be used to search for places of lodging along a route and to display search result information. A user may use client navigation device 102 to search for places of lodging. In an embodiment, client navigation device 102 is a navigation system installed in a car or other vehicle. In other embodiments, client navigation device 102 may be a portable navigation device, a smartphone, a tablet, or any other computing device.

Navigation instructions provider 104 is a module of client navigation device 102 that is at least configured to determine route(s) for traveling between a specified starting point and destination point and to provide navigation directions for navigating the route(s). Navigation logic 106 may determine navigation directions based on map data 130, which describes the locations of various geographic features and the infrastructure that connects the geographical features. In some embodiments, navigation instructions provider 104 comprises schedule information for different forms of public transportation such as buses, railroads, and shared car services.

In some embodiments, client navigation device 102 comprises Global Positioning System (GPS) receivers that are capable of receiving signals from one or more GPS satellite(s) 118. Navigation instructions provider 104 may determine the location of client navigation device 102 based on the received signals and may update the navigation directions provided to the user based on the determined current location.

Search provider application 108 is configured to locate places of lodging along a route and/or display information about the located places of lodging. Search provider application may select search points, analyze results of point searches, and determine search result information to be displayed to a user in accordance with application search logic 110.

Result presentation logic 112 may generate graphical interfaces that display search result information and may cause the graphical interfaces to be displayed at client display 114. Client display 114 may be one or more LCD screens or other display unit(s) for displaying information to a user. A user may provide input using one or more input control device(s) 116, which may include alphanumeric or other keys, a mouse, trackball, or other cursor direction keys. Input control device(s) 116 may include a microphone that provides the input to a voice processing system capable of interpreting spoken commands. In an embodiment, a touch screen is able to display content to a user and is also capable of detecting touch inputs, thus functioning as both client display 114 and input control device 116.

Search settings 132 may specify information including, but not limited to, preferred route segment lengths, preferred stop time(s), and other setting that may be used by search provider application 108. Search settings 132 may also comprise user preference 128. The user preferences may relate to attributes of lodging places and may be specified by the user or inferred based on other information received from the user such as billing address, type of device being used to search for lodging place information, and lodging places selected by the user on previous occasions. A user may modify at least some of the settings in search settings 132. Attraction information store 134 may comprise location information for a plurality of attractions and, in some embodiments search provider application 108 may use the location information to select search points.

Event data store 138 comprises information about the activities of a user interacting with client navigation device 102 or, if client navigation device 102 is used within a vehicle, activities of the vehicle. For example, event data store 138 may store information about which lodging places the user choses to stay at, which attractions the user choses to visit, the locations at which the user choses to stop at, and how frequently the user choses to stop.

Search provider application 108 may communicate with search provider server 122 via network 120, for example, to request performance of one or more point searches. Search provider application 108 may communicate with search provider server 122 via a wireless LTE (Long Term Evolution) connection. Search provider server 122 may perform one or more point searches in accordance with the search instructions specified in search server logic 124. The searches may be performed against a set of lodging places identified in lodging place information store 126. Lodging place information store 126 may store information relating to various lodging places, such as locations, availabilities at various times and days, star ratings, amenities, and other information relating to other attributes of the various lodging places.

User data 136 at search provider server 122 may comprise information about one or more users, such as a user associated with client navigation device 102 by default or another user, such as a user that logs in by providing an account username or password. User data 136 may comprise user preferences such as the types of attractions that are preferred by the user and which lodging place amenities are preferred by a user. Such user data may be explicitly provided by the user or maybe inferred based on other information. For example, some of user data 136 may be inferred based on information provided by the user such as user's history of searches, selections of lodging places, and selections of attractions. Other user data 136 may be inferred based on publicly available information about the user such as information contained in a publicly available social network profile of the user.

In an embodiment, any of the information described as stored in search settings 132 at client navigation device 102 may be stored in user data 136 at search provider server 122. Some of user data 136 may be collected from search provider application 102.

In some embodiments, a portion or all of the data and logic contained in search provider application 108 and/or navigation instructions provider 104 may be stored and performed at search provider server 122 or some other remote server. For example, in one embodiment, application search logic 110 may be located at search provider server 122 and search provider server 122 may select search points, perform point searches, select search result information for display. Also, in some embodiments, a portion or all of the data and logic contain in search provider server 122 may be stored and performed in search provider application 108.

Figure 2:
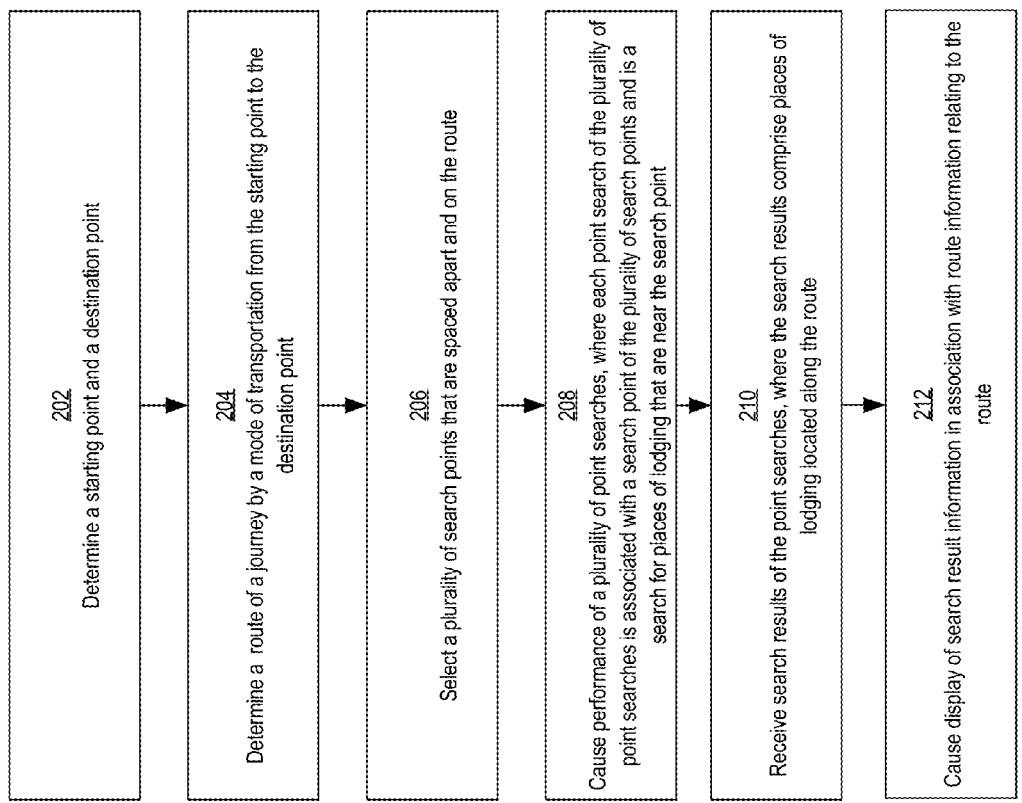
FIG. 2 illustrates an example process for searching for places of lodging and displaying search result information.

2.2 Example Processes for Locating Lodging Places and Displaying Lodging Information FIG. 2 illustrates an example process for searching for places of lodging and displaying search result information. The process of FIG. 2 may be performed at search provider application 108. In another embodiment, the process of FIG. 2, or a portion thereof, may be performed at search provider server 122.

At block 202, search provider application 108 determines a starting point and a destination point. A user may enter the starting point and destination point using input control device 116. For example, a user may identify a starting point or destination point by entering the street address of the point or the name of the points using input control device(s) 116. The user may instead identify the point by positioning a cursor on a location upon a geographical map displayed at client display 114 that corresponds to the desired starting point or destination point.

At block 204, search provider application 108 determines a route of a journey by a mode of transportation from the starting point to the destination point. The mode of transportation may be a car and the route may use public roads. In other embodiments, the mode of transportation may be a form of public transportation and the route may identify bus routes, train routes, shared ride service routes, bicycle routes, or other public transportation routes. Navigation instructions provider 104 may determine the route based on navigation logic 106 and map data 130. In some embodiments, the route is also determined based in part on public transportation information that describe routes and schedule of public transportation such as buses, trains, or shared ride services.

2.2.1 Selection of Search Points

At block 206, search provider application 108 selects a plurality of search points that are spaced apart on the route. A route typically refers to a continuous path, and the plurality of search points are distinct and discrete locations that are spaced apart along the route. The techniques for selecting the search points may vary according to different embodiments. In one embodiment, the search points are selected based at least in part on navigation directions for the journey, which may be obtained from navigation instructions provider 104. Search provider application 108 may analyze navigation directions for the route to identify significant turning points in the directions and may select locations that correspond to significant turning points in the directions as search points.

Significant turning points may be defined differently in different embodiments, and the set of search points may be constrained to the significant turning points along the route. Examples of significant turning points according to some embodiments include the exiting of a road designated as a high-capacity highway, exiting a road after traveling more than a particular amount of miles on the road, entering a road on which the user is to travel more than a particular amount of miles on the road, and a fork in a road after traveling more than a particular amount of miles on the road. Locations at or near one or more significant turning point may be selected as search points. In another embodiment, search provider application 108 selects certain locations that correspond to turning points specified in the navigation directions despite the turning points not being classifiable as significant. The location corresponding to a turning point may be the location at or near which the action of the turning point is to be performed according to the navigation directions. A turning point may not be limited only to directions that instruct the user to take a turn. For example, a direction that instructs a user to stay left to merge onto a different highway may, in some embodiments, be also considered a turning point.

Since a traveling user sometimes performs a mental context switch when encountering a significant turning point in directions, the user may find it more convenient to take an overnight break near the significant turning point rather than elsewhere.

In an embodiment, search settings 132 specify a preferred route segment length. A route segment length indicates a preferred amount of time or distance to be traveled per route segment. In some embodiments, the route segment length is represented in terms of time and, in other embodiments, the route segment length is represented in terms of distance. For example, search settings 132 may specify the route segment length as four hundred and twenty miles or seven hours.

Search provider application 108 may select one or more search points based on the one or more route segment lengths specified in search settings 132. In an embodiment where the route segment length is represented as time, search provider application 108 may select a search point by determining the amount of time that is estimated to elapse while traveling on the route from a first point on the route until the search point is reached. The first point on the route may be the starting point of the route, the point of the last stop, or the point of another search point. Search provider application 108 may compare the determined amount of time with the amount of time identified in the route segment length. For example, search settings 132 may specify a route segment length of ten hours. Search provider application 108 may select two points on the route including the point that is estimated to be reached after ten hours of traveling on the route from the starting point and the point that is estimated to be reached after twenty hours of traveling on the route from the starting point.

In an embodiment where the route segment length is represented as a distance, search provider application 108 may select one or more search points by, at least in part, comparing the distance on the route from a starting point of the route to the search point with the distance amount identified in the route segment length. For example, search provider application 108 may select a point on the route that that is estimated to be reached after three-hundred miles of traveling on the route from the starting point based on a route segment length of three-hundred miles.

In one embodiment, the specified route segment length is a preference regarding the amount of time or distance that elapses from the starting point or between proposed or actual stopping points while traveling on the route. In such an embodiment, a search point may be selected by, for example, locating the point on the route that is the specified distance away from the starting point of the route. In another embodiment, the route segment length applies to the amount of time or distance that elapses between two stops specified while traveling on the route. In such an embodiment, a search point may be selected by, for example, locating the point on the route that is the specified distance away from the last stop while traveling on the route or from another search point which may be proposed as a stopping point.

Some search points selected based on a specified route segment length may not correspond exactly to the specified length. For example, search settings 132 may specify a route segment length of ten hours and search provider application 108 may select three different search points, including the point on the route that is estimated to be reached after nine hours and fifty minutes of traveling on the route from the last stop, the point on the route that is estimated to be reached after ten hours of traveling on the route from the last stop, and the point on the route that is estimated to be reached after ten hours and ten minutes of traveling on the route from the last stop.

By displaying at least some search points at roughly evenly spaced distances or times, each space being roughly the same length as the specified route segment length, a user may be able to evenly space apart stops on his journey. By performing a plurality of point searches near a particular route segment boundary, client navigation device 102 may propose the best stopping point out of a set of stopping points that are all near the particular route segment boundary. For example, the lodging places located near the search point at ten hours and ten minutes into the route may match the user's preferences much better than the lodging place located near the search point at ten hours into the route.

In an embodiment, search settings 132 specify a preferred stop time. The preferred stop time may be stored in search settings 132 before the determination of any specific route. For example, search setting 132 may specify that 10 PM is a preferred stop time. Search provider application 108 may select a particular point on the route as a search point based at least in part on a comparison of the time at which the particular point on the route is estimated to be reached and the preferred stop time. Based on the search setting that specifies 10 PM as the preferred stop time, search provider application 108 may select the particular location on the route that is estimated to be reached at 10 PM as a search point. Search provider application 108 may select a plurality of search point based on a stop time, such as a search point corresponding to ten minute after the stop time, a search point corresponding exactly to the stop time, and a search point corresponding to ten minute before the stop time.

In some embodiments, the preferred stop time is associated with a particular time zone, such as the Pacific Standard Time (PST) time zone or the Coordinated Universal Time (UTC) time zone. In such an embodiment, search provider application 108 may select the point on the route which is estimated to be reached when the specified time occurs in the particular time zone.

In another embodiment, the time zone applicable to the preferred stop time is determined based on the location of client navigation device 102. For example, if client navigation device 102 is located in a region that observes the Mountain Time Zone (MST), the time zone applicable to the preferred stop time may be MST until the client navigation device enters a different time zone. If a search setting specifies that the preferred stop time is 10 PM local time, search provider application 108 may select one or more points on the route that are estimated to be reached at 10 PM local time.

In some embodiments, one or more search points are selected based on their proximity to one or more attractions. Attraction information store 134 may comprise location information for a plurality of attractions. Search provider application 108 may determine the locations of a plurality of points on the route. Based on the location information for the plurality of points on the route and the location information for the plurality of attractions, search provider application 108 may determine if any of the plurality of points on the route is within a particular threshold distance from any of the one or more attractions. If so, search provider application 108 may select the point within the particular distance as a search point. In some embodiments, search provider application 108 may select another point on the route near the particular attraction as a search point instead if the other point is determined to be closer to the particular attraction.

In some embodiments, client navigation device 102 may display search result information indicating that a particular stopping point is near an attraction and may include information about the nearby attraction. This may be helpful to a traveling user who may wish to visit popular attractions during his stop and would otherwise be unaware of how near the point on the route is to the attraction. The display of search result information may include highlighting the location of the selected search point on a map showing the route in addition to highlighting the location of the attraction on the map showing the route.

In some embodiments, some search points are selected on the basis of their proximity to attractions that are determined to be of interest to the user associated by default with client navigation device 102 or another user, such as a user that logs in by providing an account username or password. User settings 128 or user data 136 may indicate which categories are preferred by the user. For example, user settings 128 may indicate that a user's preferred categories include natural landmarks but do not include shopping areas or amusement parks. In such an embodiment, client navigation device may select certain search points based on their proximity to natural landmarks but may not select any search points on the basis of their proximity to shopping areas or amusement parks.

In some embodiments, a user's preferred attraction categories may not be explicitly specified by the user but may instead be inferred based on other information collected about the user. Search provider server 122 may determine a user's interest based on information shared by the user publicly or directly with the search provider associated with search provider server 122. In some embodiments, a user may provide search provider server 122 access to information shared by the user in a social network or such information may be publicly accessible. For example, search provider server 122 may determine that a user's hobbies include hiking based on a publicly accessible social network profile of the user. Based on such information, search provider server 122 may infer that the user prefers the attraction category of "Hiking Trails" or a broader category of "Natural Landmarks." Search provider application 108 may select certain search points based on a determination that the search point is within a threshold distance from an attraction belonging to the attraction category of "Natural Landmarks." Search provider application 108 may display information about such attractions that are determined to be within a threshold distance from a search point Various embodiments may combine one or more of the above techniques for the selection of a search point. For example, some of the search points may be selected based on preferred stop times and other search points may be selected based on a route segment length specified in search settings 132 or user data 136.

In some embodiments, search provider application 108 provides a starting point and a destination point to search provider server 122 and search provider server 122 determines one or more routes from the starting point to the destination point. Search provider 122 may also select search points on the route using one or more of the techniques described herein. In an embodiment, search provider server 122 determines at least two routes from the starting point to the destination point and selects search points on the at least two routes. After performing point searches based on the search points, search provider server 122 may provide the results of the point searches to search provider application 108. As described below, such search result information may be used to provide the user with information about lodging places along both of the routes.

At block 208, search provider application 108 causes performance of a plurality of point searches, where each point search of the plurality of point searches is associated with a search point of the plurality of search points and is a search for places of lodging that are near the search point. Search provider application 108 may send the location for each selected search point to search provider server 122 and request execution of point searches based around the search points.

At block 210, search provider application 108 receives the search results for the point searches. The search results may be received from search provider server 122 and each search result may identify a particular place of lodging. The received search result information may include further information about the lodging places, such as contact information, applicable star rating, reviews of other users, list of amenities, and other information relating to the lodging places.

Search provider server 122 may have, for each identified search point, performed a point search based upon the search point. Performing a point search based upon the search point may comprise locating all places of lodging located within a particular distance from the search point. Search provider server 122 may have performed the search against the set of lodging places identified in lodging place information store 126.

Lodging place information store 126 may include availability information for each lodging place. Search provider server 122 may determine, for each of the search points, the estimated time at which the search point is to be reached and may only return the lodging places that are available at the estimated time as a search result. In other embodiments, the search result information displayed by search provider server 122 may indicate which lodging places have availability at the estimated time.

In some embodiments, the search results may be filtered before display. For example, in one embodiment, the search provider application 108 removes, from the search results, one or more particular results that would require travel over a significantly diverging route; examples include search results that require backtracking from the next major intersection along the route with respect to a current position of the end user, search results that are greater than a specified threshold distance from a main road of the route, etc.

2.2.2 Display of Search Result Information

At block 212, search provider application 108 causes search result information to display in association with route information relating to the route. Search provider application 108 may cause the search result information to display at client display 114.

Figure 3:
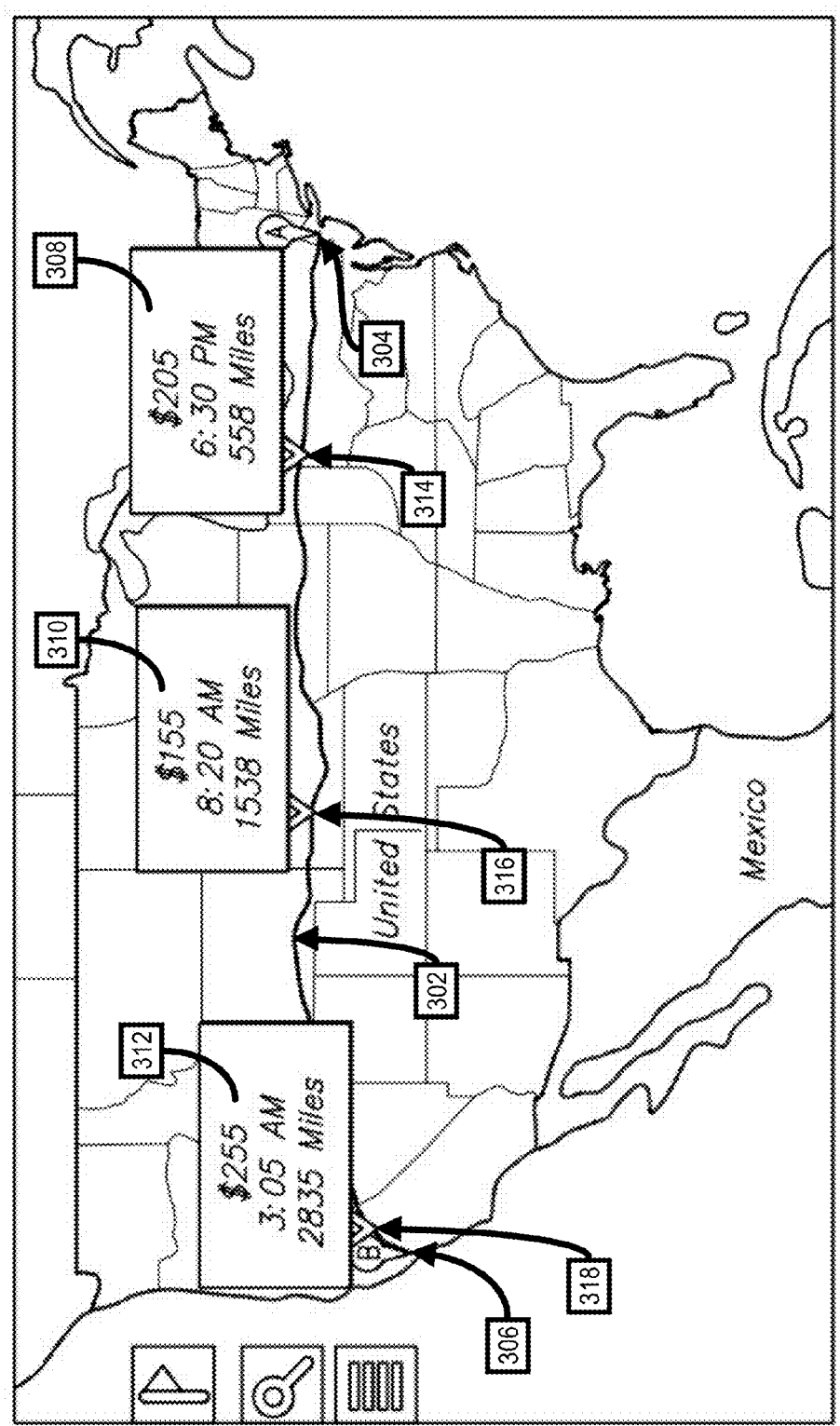
FIG. 3 illustrates an example graphical interface that displays search result information in association with route information.

FIG. 3 illustrates an example graphical interface that displays search result information in association with route information. In an embodiment, the route 302 is highlighted upon a geographical map. Line 302 represents the route from starting point 304 to destination point 306. Each of result display items 308, 310, and 312 is displayed in association with a particular search point on the route. Result display item 308 is displayed in association with search point 314, result display item 310 is displayed in association with search point 316, and result display item 312 is displayed in association with search point 318.

Result display items 308, 310, and 312 identify the estimated amount of time and distance until the corresponding search point is reached and also identify the price of the most inexpensive lodging place out of the set of lodging places returned as search results for the point search based upon the corresponding search point. In an embodiment, search points 314, 316, and 318 are emphasized on a geographical depiction of a map but the result display items associated with the search points are only visible upon selection of the search point. In other embodiments, the result display item may be visible even before a user selection of a search point. In other embodiments, result items may be selected and shown based upon criteria other than low price, for example, based upon quality rating or proximity to a main road of the route.

Figure 4:
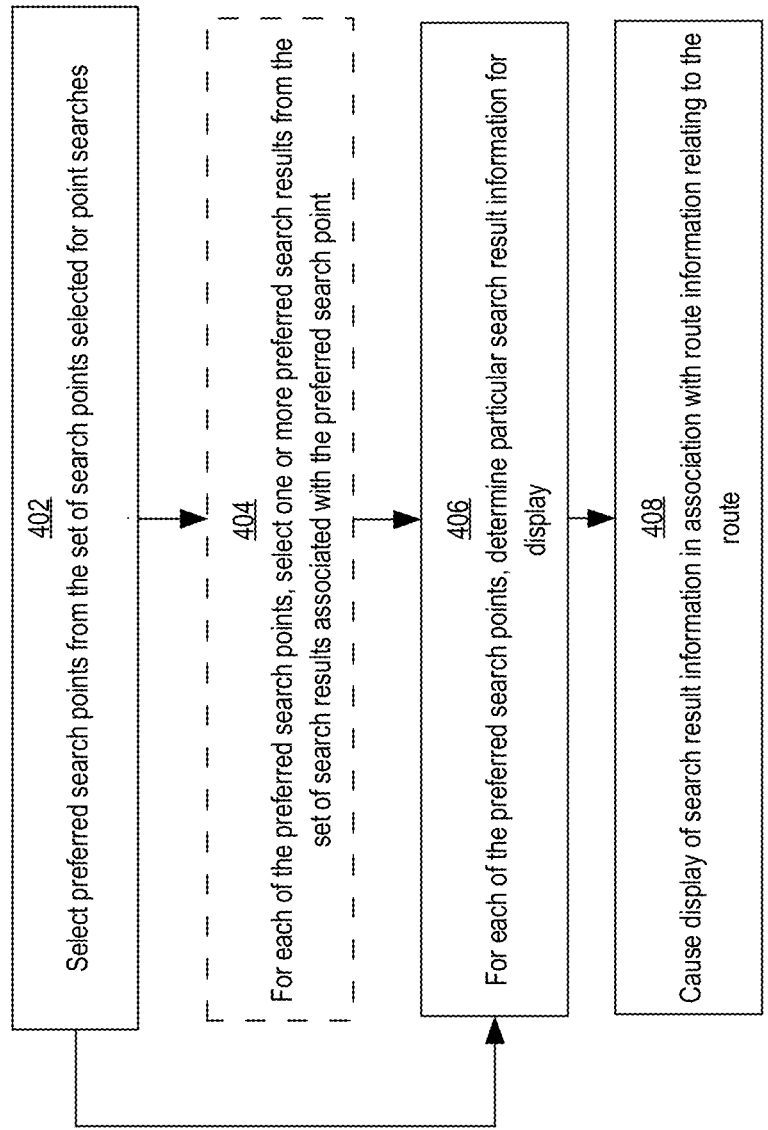
FIG. 4 illustrates an example process for selecting search result information for display in association with route information.

FIG. 4 illustrates an example process for selecting search result information for display in association with route information. The process of FIG. 4 may be performed at search provider application 108. In another embodiment, the process of FIG. 4, or a portion thereof, may be performed at search provider server 122. The search result information displayed in the graphical interface illustrated in FIG. 3 may be selected according to the process of FIG. 4.

At block 402, search provider application 108 selects preferred search points from the set of search point selected for point searches. In some embodiments, only the preferred search points are presented as proposed stopping points in the route. For example, search points 314, 316, and 318 in FIG. 3 may all be preferred search points and may thus be highlighted upon the graphical depiction of the route. In other embodiments, preferred search points may be emphasized in other ways during the display of search result information. In an embodiment, search provider application 108 selects the preferred search points based at least in part on the search results of the point searches based upon the particular search points.

In an embodiment, a price representing the search results of a search point is determined for each of a plurality of search points based on the search results of the point search based on around the search point. The representative price of the search point may be a median price, mean price, maximum price, or some other price representing the set of search results of the point search based upon the search point.

The representative price of a search point may be based on the representative prices of the search results of the point search based on the search point. In an embodiment, the representative price for a search result is the nightly rate for the most inexpensive room in the lodging place corresponding to the search result.

In some embodiments, the representative price of a search result is based in part on the cost of parking at the lodging place corresponding to the search result. For example, the representative price for a search result may be the nightly rate for the most inexpensive room in the lodging place corresponding to the search result in addition to the nightly rate for overnight parking at the lodging place.

The preferred search points may be selected based at least in part on the representative prices of the search points. For example, search points may be clustered based on their locations, where each cluster represents search points that are relatively near each other. Each search point in a cluster of search points may be within twenty miles of each other. For each cluster of search points, the search points may be ranked from least expensive to most expensive based on the representative prices of the search points. The bottom half of the search points in a cluster may be eliminated from consideration for selection as a preferred search point. By considering price information, client navigation device 102 may propose certain search points as stopping points if they are relatively inexpensive compared to other search points.

In another embodiment, search points are selected based on the number of search results that result from the point search based upon the search point. For example, search provider application 108 may eliminate a search point from consideration for selection as a preferred search point if the point search based upon the search point resulted in less than five different lodging places. If a point search based upon a particular search point does not result in many search results, the search point may be an unpopular stopping point. The popular stopping points may be more enjoyable for a user. For example, the popular stopping points may be in regions that are more tourist-focused and the regions thus may offer more activities and goods that would interest a traveling user.

In some embodiments, the selection of preferred search points is in accordance with conditions regarding the minimum or maximum number of preferred search points per any portion of the route of a given size. For example, one search point selection conditions may indicate that at least one search point in any given one-hundred mile long portion of the route must be selected as a preferred search point. As another example, another search point selection condition may indicate that a maximum of one search point may selected as a preferred search point in any given ten-mile long portion of the route. A portion of the route of a particular distance includes all the locations on the route that would be traveled if the particular distance was traveled on the route. A minimum condition may ensure that enough lodging options are presented to allow the user to have flexibility in selecting stopping points. A maximum condition may ensure that the number of lodging options is not so large that it overwhelms a user.

In an embodiment, certain search results included in the results of a point search based upon a search point are filtered out. The filtering may be performed before a set of search results is considered for purposes of selecting preferred search points, which may affect which search points are selected as preferred search points. For example, if hotels that do not fit the user's criteria are filtered out from the set of search results returned from the point search of the search point, a particular search point may not be associated with any search results. Thus, the search point may not be selected as a preferred search point. In other embodiments, the filtering is performed after search points are selected but before search result information is displayed. In some embodiments, preferred search results may be selected and the filtering may occur before the selection of preferred search results.

A user may specify preferences for attributes of lodging places such as brands, star ratings, and amenities. Examples of amenities include availability of a swimming pool or fitness center, number of beds, whether pets are allowed, and whether free breakfast is included. A user may also specify that he or she prefers free parking or some other maximum amount for parking at the lodging place. Based on this preference, search provider application 108 may only show lodging places that offer parking at the specified rate. In another embodiment, search provider application 108 may cause lodging places that offer parking at the specified rate to be displayed before other lodging places in the set of search results. Embodiments may allow users to specify any combination of the foregoing or other preferences.

In some embodiments, search provider application 108 may infer user preferences based on other information collected relating to the user. For example, search provider application 108 may infer a user's preferred star rating based on the user's billing address or based on the brand or type of client navigation device being used. Search provider application 108 may infer that a user prefers lodging places of certain star ratings based on the brand of the user's client navigation device. In some embodiments, some preferences may be requirements and others may not be requirements. Information stored in association with user preferences 128 or user data 136 may indicate which preferences are requirements.

Search provider application 108 may filter out a lodging place from the search results if the lodging place does not satisfy a user requirement. In other embodiments, search provider application 108 may filter out search results based on other criteria, such as a large proportion of customer reviews for the search result being negative, or the search results may not be filtered at all.

Various embodiments may combine one or more of the above techniques for the selection of a preferred search point. For example, some search points may be selected as preferred search points based on a determination that the search points are associated with a large number of search results. Other search points may be selected based on a determination that the representative prices of the search points are low. As another example, a search point may be required to have a low representative price and a large number of associated search results to be selected as a preferred search point.

A search point may be selected as a preferred search point based on the characteristics of the lodging places included as search results for the point search based on the search point. For example, one or more characteristics of one or more lodging places included as search results for one or more different search points may be compared. The characteristics may relate to attributes such as the distance of the lodging place from the route, whether the lodging place is available at the estimated time at which the lodging place will be reached, the star rating of the lodging place, ambiance of the lodging place, and/or the cost of the lodging place relative to other characteristics of the lodging place, such as the amenities offered by the lodging place, the star rating of the lodging place, and the user ratings of the lodging place.

A search point may be selected as selected search point based on a determination that a lodging place included as a search result for the search point includes a large amount of preferred characteristics compared to other lodging places. In another embodiment, the selection of the search point may be based on an evaluation of only one attribute; the characteristic for that attribute for the particular lodging place may be preferred over the characteristics of the other lodging places for that attribute. For example, a search point may be selected as a preferred search point based on a determination that the point search based on the search point resulted in a lodging place that is priced relatively low when compared to other lodging places with similar user ratings, including lodging places included as search results for other point searches.

At block 406, for each of the preferred search points, search provider application 108 determines particular search result information for display. For each preferred search point, the search result information may be displayed in association with the location of the preferred search point. The determined search result information may describe attributes of one or more of the search results included in the filtered set of search results. For example, the search result information may specify the price of the least expensive lodging place returned as a search result for a point search based upon the search point after filtering.

Alternatively or additionally, the search result information may include other information such as the average price for each lodging place returned as a filtered search results, the maximum star rating for each lodging place returned as a filtered search results, and the average star rating for each lodging place returned as a filtered search results. According to certain embodiments, the average price may take into consideration the cost of parking at the various lodging places represented by the search result information. As another example, for each amenity of a set of amenities that is available at any lodging place of the filtered set of search results for a particular search point, the search result information corresponding to the search point may include symbols representing the amenity. In some embodiments, there may be no filtering of search results.

The display of the selected search result information in association with the location of the corresponding search point may assist a user in selecting a stopping point. For example, in an embodiment where the location corresponding to a search point on a map is displayed in association with a representative price for the search point, a user may determine that stopping thirty minutes later during his journey would result in a saving of forty dollars. A traveling user that is indifferent to stopping at a particular time versus thirty minutes after the particular time may prefer to stop thirty minutes later based on the information.

At block 404, in some embodiments, one or more particular search results are selected as preferred search results based on one or more user preferences. Search provider application 108 may cause search result information representing only the one or more preferred lodging places, rather than all lodging places included in the filtered set of search results, to display in association with the location of the search point upon a graphical depiction of a geographical map. The preferred search result(s) may be the one or more search results that search provider application 108 determines to be the best match out of the filtered set of search results associated with the search point based on the user's preferences.

Other criteria for selecting a particular lodging place as a preferred search result(s) may include the distance of the lodging place from the route, whether the lodging place is available at the estimated time at which the lodging place will be reached, the star rating of the lodging place, ambiance of the lodging place, and/or the nightly rate of the lodging place relative to other characteristics of the lodging place, such as the amenities offered by the lodging place, the star rating of the lodging place, and the user ratings of the lodging place.

For example, in one embodiment, result display item 312 may identify the name of the lodging place that best matches the user's preferences out of the filtered set of search results associated with search point 318, along with the nightly rate for the lodging place. Symbols representing the amenities available at the lodging place, the star rating of the lodging place, and a telephone number for the lodging place, whether the lodging place has availability at the time at which the lodging place is estimated to be reached, and/or the amount of rooms or beds available may be displayed in association with the preferred search result. If the lodging place has multiple types of rooms available with different rates, the different types of rooms may be described along with their associated rates.

In some embodiments, the nightly rate of the lodging place may be the nightly rate for staying at the lodging place in addition to the nightly rate for parking at the lodging place. In other embodiments, search provider application 108 may only consider the nightly rate for staying at the lodging place as the nightly rate of the lodging place.

The selection of preferred search results may also, or instead, be based on other information such as user ratings. In some embodiments, search provider application 108 selects a preferred lodging place on the basis of the lodging places' nightly rate without considering amenities, or star ratings, or user ratings. In other embodiment, search provider application 108 may not select preferred search results.

At block 408, search provider application 108 causes display of the search result information in association with route information relating to the route. Search provider application 108 may cause the search result information to display at client display 114.

In some embodiments, search provider application 108 determines multiple routes between the starting point and destination point and searches for places of lodging along both routes. Search provider application 108 may cause each of the determined routes to be highlighted upon a graphical depiction of a geographical map. Search result information relating to lodging places along both routes may also be displayed.

Figure 5:
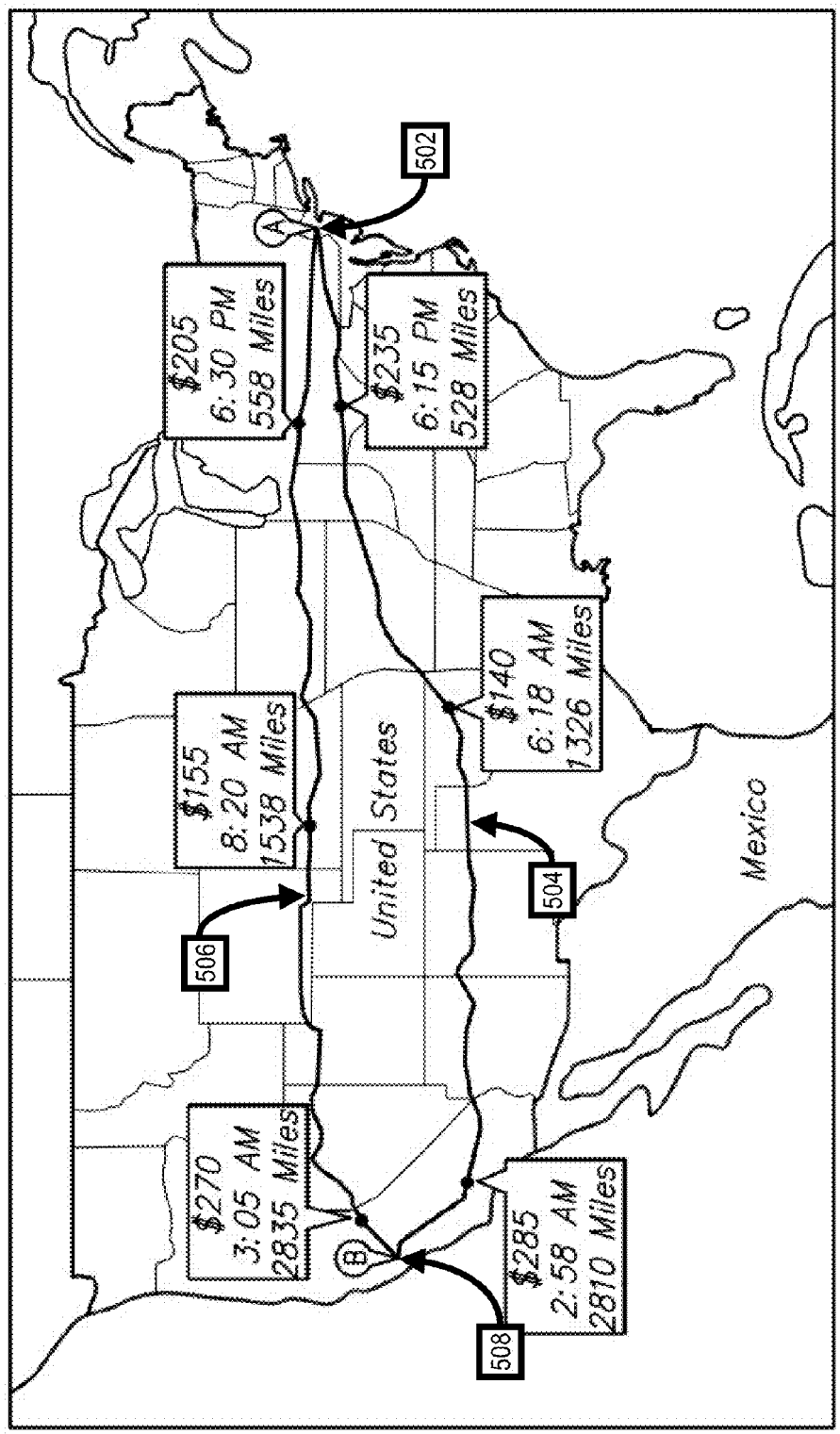
FIG. 5 is an example graphical interface that displays information relating to places of lodging along two different routes between a starting point and a destination point.

FIG. 5 is an example graphical interface that displays information relating to places of lodging along two different routes between a starting point and a destination point. Search points may have been selected along both routes and the process of FIG. 4, or some other process for determining search result information, may have been performed based on the search results of both sets of point searches. Viewing information about lodging options along both routes may help a user select one route over another. For example, a user may determine that the lodging places along route 504 are generally cheaper than the lodging places along route 506. Based on that observation, the user may select to travel from starting point 502 to destination point 508 along route 504.

In some embodiments, both the locations of the lodging places along the route and locations of attractions near to one or more the lodging places may be annotated upon the map. For example, the location of the biggest ball of twine in the US may be annotated upon the map displayed in FIG. 4 if the location is determined to be within a threshold distance from route any location on route 504 or route 506. Based on the displayed information, a user may select a lodging place close to the biggest ball of twine if he is interested in visiting such an attraction.

Figure 6:
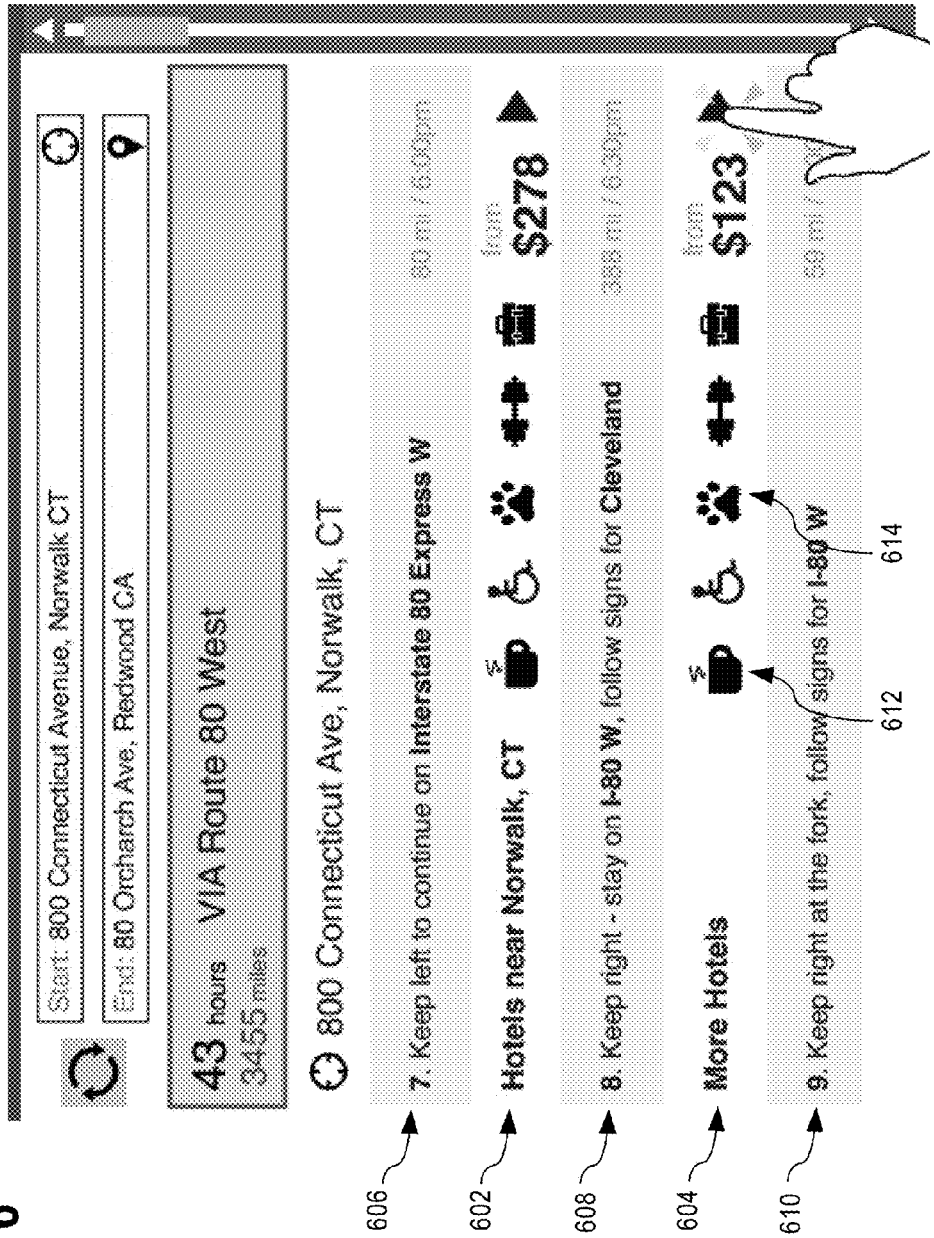
FIG. 6 illustrates another example graphical interface that displays search result information in association with route information.

FIG. 6 illustrates another example graphical interface that displays search result information in association with route information. Navigation directions 606, 608, and 610 each specify directions for navigating a particular turning point on the route. Navigation directions 606, 608, and 610 are interleaved with result display items 602 and 604. Result display item 602 represents a particular search point located in Norwalk, Conn. The particular search point corresponding to result display item 602 may be located at or near the turning point corresponding to result display item 606 or the turning point corresponding to navigation direction 608. The turning point corresponding to result display item 606 is the point on the route at which the user is to perform the navigation direction specified in result display item 606.

In another embodiment, the particular search point corresponds to a location that is on the route between the turning point corresponding to navigation direction 606 and the turning point corresponding to navigation direction 608 but is not necessarily near either turning point. For example, the particular search point may be a location roughly halfway between the two turning points.

Result display item 604 represents a plurality of search points. For example, result display item 604 may represent a group of search points, each of which are located between the turning point corresponding to navigation direction 608 and the turning point corresponding to navigation direction 610. In an embodiment, in response to the selection of result display item 604, search result information related to the plurality of search points represented by result display item 604 may display.

In other embodiments, search result information may be displayed in association with navigation directions in other ways. For example, the result display items may be displayed next to navigation directions rather than between navigation directions. In some embodiments, the result display items may be collapsible. A user may select to view a result display item by selecting a component near a particular navigation direction. For example, result display item 602 may appear or disappear in response to the selection of a component displayed in association with navigation direction 606.

In some embodiments, result display items 602 or 604 may indicate information about attractions that are located near search points corresponding to result display item 602 or 604. For example, result display item may also include the text "Nearby Attraction: Biggest Ball of Twine in the U.S."

Figure 7:
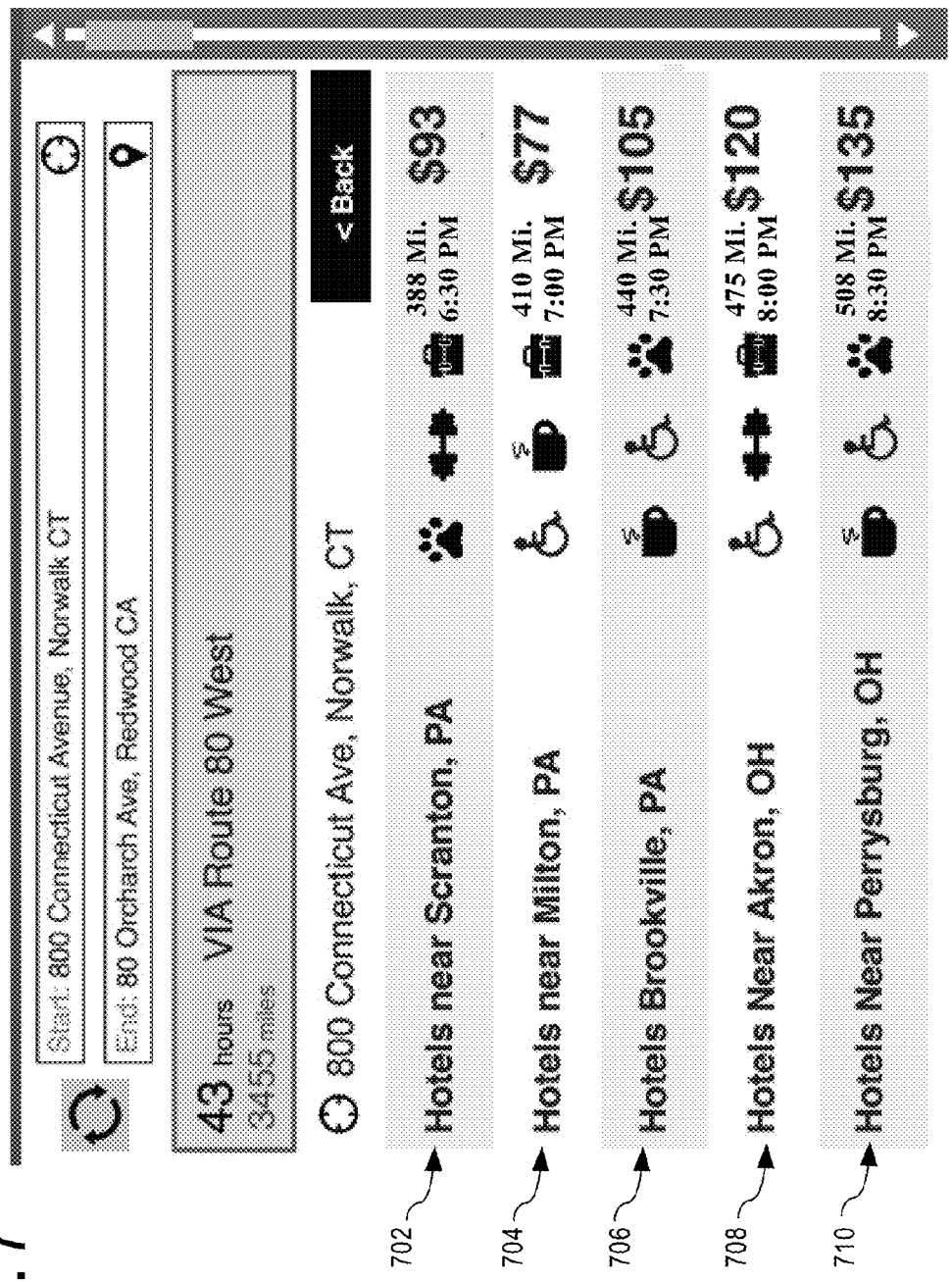
FIG. 7 illustrates an example graphical interface that may display in response to the selection of a result display item that corresponds to a plurality of search points.

FIG. 7 illustrates an example graphical interface that may display in response to the selection of a result display item that corresponds to a plurality of search points. Search provider application 108 may cause the graphical interface illustrated in FIG. 7 to display in response to the selection of result display item 604. Result display items 702, 704, 706, 708, 710 may each correspond to a search point on the route between the turning point corresponding to navigation direction 608 and the turning point corresponding to navigation direction 610.

In some embodiments, characteristics of lodging places are identified to a user without identifying the name of the lodging place. For example, a particular lodging place may be identified by displaying the price of the lodging place, star rating of the lodging place, the distance of the lodging place from the route, the distance of the lodging place from the location of the user, and/or amenities offered by the lodging place, without identifying the name of the lodging place. In some embodiments, the distance is expressed in terms of time, which may be calculated based on the user's observed velocity or a velocity value stored in search settings 132 or user data 136.

A discount may be applied to the price of the lodging place if the lodging place is selected for reservation without the name or exact address of the lodging place being displayed to the user. For example, certain lodging places may be willing to offer reduced rates if the identity of the lodging place is only fully disclosed if after a stay of the overnight is purchased.

In an embodiment, an inquiry is presented to a user identifying a set of characteristics for each of two or more lodging places, without identifying the names of the lodging place and the user is requested to select the set of characteristics that are preferred by the user. For example, a message of "Would you like to travel five (5) minutes of the route and save up to 10%, or would you like to travel ten minutes (10) off the route to save up to 20%" may be present to the user, which displays characteristics of the lodging places for the attribute of distance from the route and the attribute of amount of discount applicable to the lodging place. The two or more lodging places whose characteristics are identified may all be selected as preferred search results.

A user may select a user interface control associated with a particular set of characteristics. The selection of the control may cause search provider application 108 to send a request to reserve a stay at a lodging place associated with the particular set of characteristic to search provider server 122. In response to receiving an indication of the selection of the user interface control, search provider application 108 may automatically reserve the lodging place corresponding to the selected set of characteristics. Search provider server 122 may submit payment information to the lodging place being reserved such as, for example, the user's credit card information. Details including name and address may be displayed after the payment transaction for the reservation has completed.

Other examples of attributes whose characteristics may be identified in the inquiry include star ratings, review ratings, types of amenities offered, amount of amenities offered, and/or ambiance of the lodging place. A user's preference for ambiance may be stored in search settings 132 or user data 136. For example, if it determined that the user prefers a romantic ambiance based on search settings 132 or user data 136, search provider application 108 may cause the message of "Would you like to pay $100 for a lodging place with an ambiance preferred by business travelers or $120 for a lodging place with a romantic ambiance" to display.

The user's response to the inquiry may be used to select a particular lodging place from two or more lodging places included as search results of a search based on one search point. In another embodiment, the user's answer to the inquiry is used to select a particular lodging place from two or more lodging places included as search results of searches based on different search points.

The inquiry may be presented when a particular search point is selected. A user may select a search point by selecting the corresponding result display item, such as result display item 310 in FIG. 3 or result display item 702 in FIG. 7. In response to the selection of a search point, search provider application 108 may cause display of an inquiry that describes characteristics of two lodging places included as search results for the search point. In another embodiment, in response to the selection of a search point, search provider application 108 may cause display of an inquiry that describes characteristics of a lodging place included as search results for the first search point that was selected and another lodging place included as a search result for a second search point. The second search point may be selected based on a determination that it is located nearby to the selected search point.

In an embodiment, a user may specify characteristics of a lodging place and a maximum bid amount for a lodging place that matches the set of specified characteristics. Once the user selects a particular control, search provider application 108 submits the specified attributes and maximum bid amount as a binding offer to search provider server 122. The specified attributes may be one or more of a maximum amount of distance or time that must be traveled until the lodging place is reached, a maximum amount of distance or time required that must be traveled off the route to reach the lodging place, and a minimum star rating, required amenities of the lodging place. The calculation of distance or time may be based on the location of the user at the time the request is received is sent to search provider server 1122.

Search provider application 108 may determine if a lodging place matching the specified characteristics is available. If so, search provider application 108 may reserve a lodging place matching the specified characteristics for the user. Search provider server 122 may submit payment information to the lodging place being reserved. Details including name and address may be displayed after the payment transaction for the reservation has completed. If no matching lodging place is available, the user may be notified and provided another opportunity to submit a winning bid. The user may do so by selecting different characteristics or changing the bid value.

Figure 8:
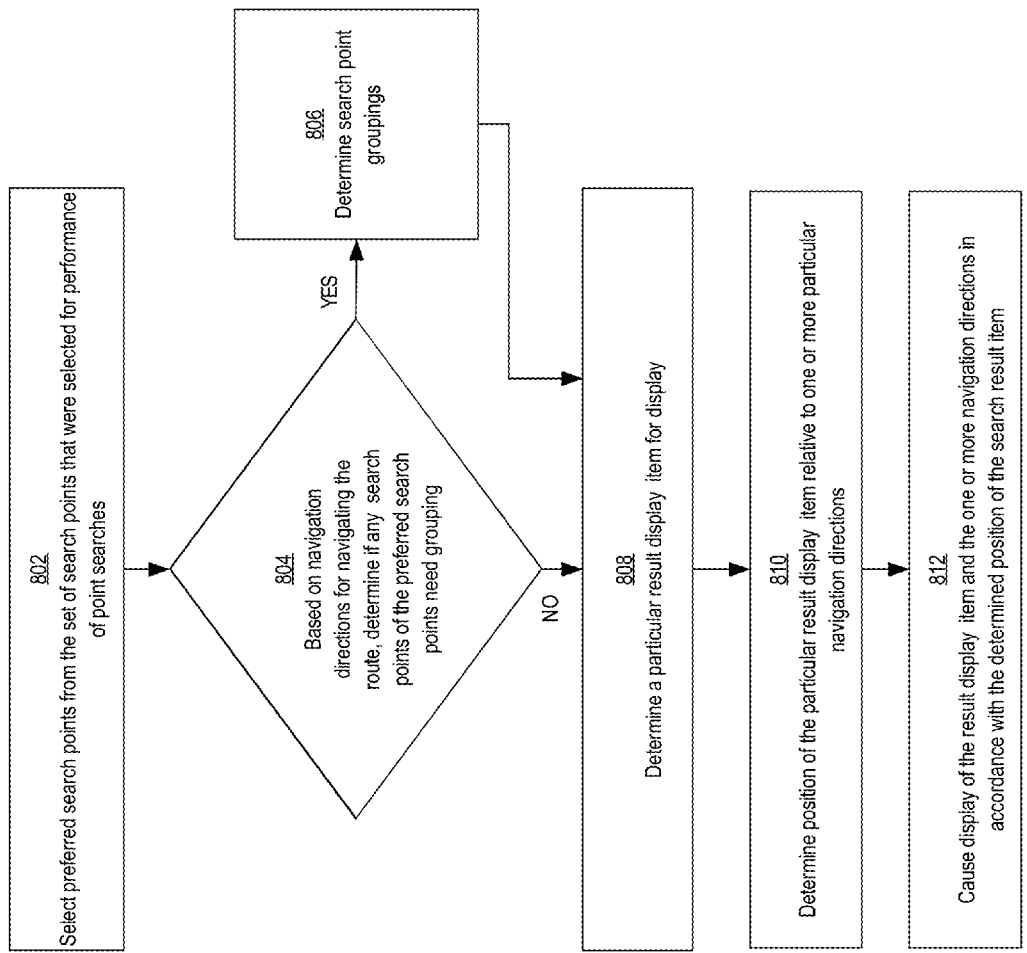
FIG. 8 illustrates another example process for selecting search result information for display in association with route information.

FIG. 8 illustrates another example process for selecting search result information for display in association with route information. The process of FIG. 8 may be performed at search provider application 108. In another embodiment, the process of FIG. 8, or a portion thereof, may be performed at search provider server 122.

At block 802, search provider application 108 selects preferred search points from the set of search points that were selected for performance of point searches. The preferred search points may be selected according to one or more of the techniques described herein, such as the techniques described with respect to block 402. For example, preferred search points may be selected based at least in part on the search results of the points searches based upon the search points and/or conditions on the selection of search points. Additionally, filtering of search results may be performed before or after the selection of preferred search points.

In an embodiment, application search logic 110 specifies a condition that at least one search point must be selected as a preferred search point between any two turning points more than a particular number of miles apart if any such search point results in a search result. Such a condition may ensure that sufficient lodging place options are visible to a user at any given time.

At block 804, search provider application 108 determines if any search points of the preferred search points need grouping based on navigation directions for navigating the route. Search provider application 108 may obtain the navigation directions from navigation instructions provider 104. If so, at block 806, search provider application 108 determines search point groupings.

In one embodiment, a maximum of one result display item may be displayed between any two given navigation directions. Determining if any search points of the preferred search points need grouping may comprise determining if, for each pair of consecutive navigation directions, multiple preferred search points are located between the two the turning points that correspond to the two navigation directions. If so, each of the multiple preferred search points may be grouped into one group. In other embodiments, search points may not be grouped or may be grouped for different reasons such as based only on proximity to each other and without considering their locations relative to the locations of the turning points.

At block 808, search provider application 108 determines a particular result display item for display. The result display item may represent a search point or a group of search points. Search provider application 108 may select information to include in a result display item using one or more of the techniques described herein, such as the techniques described with respect to block 406. For a result display item that represents a single search point, particular search result information in the result display item may describe attributes of a particular search result or all search results included in a filtered or non-filtered set of search result. In one embodiment, the particular search result information only describes one or more preferred search results, where the preferred search results may be determined according to user preferences or other techniques described herein, such as the techniques described with respect to block 404.

For a result display item that represents a group of search points, search result information in the result display item may describe attribute(s) of a particular search result of a point search based upon a particular search point. For example, the result display item may identify the price of the least expensive lodging place out of all of the filtered search results for all the point searches based upon all of the preferred search points in the group. In another embodiment, the search result information may identify the price of a search result that is determined to be the preferred search result out of all of the filtered search results for all the point searches based upon all of the preferred search points in the group.

As another example, the search result information may represent all of the filtered search results for all the point searches based upon all of the search points in the group. For example, for each of a set of amenities, a symbol representing the amenity may be displayed if any filtered search result of any point searches based upon any of the preferred search points in the group provides the amenity. Result display item 610 may represent a particular search point group. Amenity symbol 612 may correspond to an amenity that is only provided by a lodging place that is only included as a search result for a point search based upon a first search point of the particular search point group. Amenity symbol 614 may correspond to an amenity that is only provided by a lodging place that is only included as a search result for a point search based upon a second search point of the particular search point group, where the first search point is different from the second search point. The availability of a particular amenity, such as the pet-friendliness, may be very important to a user. Other amenities, such as the availability of a fitness center, may be preferred by the user but may be less important. Client navigation device 102 may list any of the amenities available at any of the hotels in association the location of a search point. Based on such information, a traveling user may be able to easily compare and select stopping points.

At block 810, search provider application 108 determines the position of the result display item relative to one or more particular navigation directions. Search provider application 108 may determine a position of a result display item relative to the one or more navigation directions by, at least in part, comparing the locations of the turning points corresponding to the navigation directions with the location of the search point(s) corresponding to the result display item. If the result display item represents a group of search points, the set of search points corresponding to the result display item may be the set of search point in the group.

The result display item may directly follow, or may otherwise be displayed in association with, the navigation direction that corresponds to a turning point that is located nearest to the search point(s) out of all the turning points occurring before the search point(s) on the route. The result display item may be displayed directly before the navigation direction that corresponds to a turning point that is located nearest to the search point(s) out of all the turning points occurring after the search point(s) on the route, or may be otherwise displayed in association with the navigation direction.

At block 812, search provider application 108 causes display of the result display item and the one or more navigation directions in accordance with the determined position of the result display item. For example, in response to determining that result display item 602 directly follows navigation direction 606 and directly precedes navigation direction 608 and that result display item 604 directly follows navigation direction 608 and directly precede navigation direction 610, search provider application 108 may cause the graphical interface of FIG. 6 to display at client display 114.

The position of the result display item relative to the navigation directions may help a user to quickly understand the general location of the particular lodging places that are represented by the result display item. Furthermore, such an approach may allow a user to quickly obtain information about available lodging options since the lodging information may be viewed at the same time and in the same general region of the display as the navigation directions.

Figure 9:
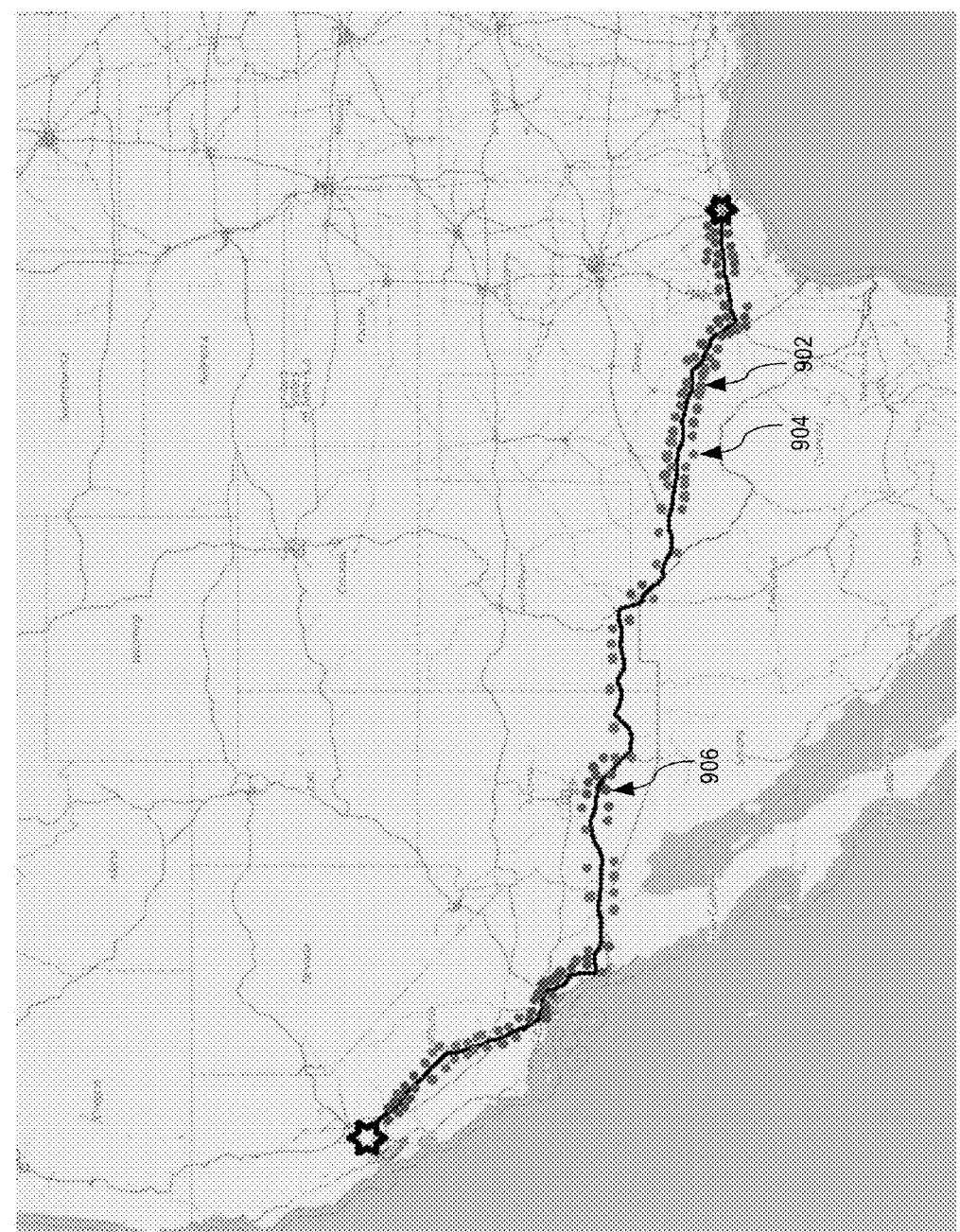
FIG. 9 illustrates another example graphical interface that displays search result information in association with route information.

FIG. 9 illustrates another example graphical interface that displays search result information in association with route information. Annotations 902, 904, and 906 and the remaining colored annotations upon the geographical map may each represent a lodging place that is located along the route and included as a search result of a point search based upon a search point located on the route. A color of annotation may indicate the relative price of a lodging places whose location corresponds to the location of the annotation. For example, the color purple of annotation 902 may indicate that a lodging place whose location corresponds to the location of annotation 902 on the map is moderately expensive, the color green of annotation 904 may indicate that a lodging place whose location corresponds to the location of annotation 904 on the map is inexpensive, and the color red of annotation 906 may indicate that a lodging place whose location corresponds to the location of annotation 906 on the map is expensive.

Figure 10:
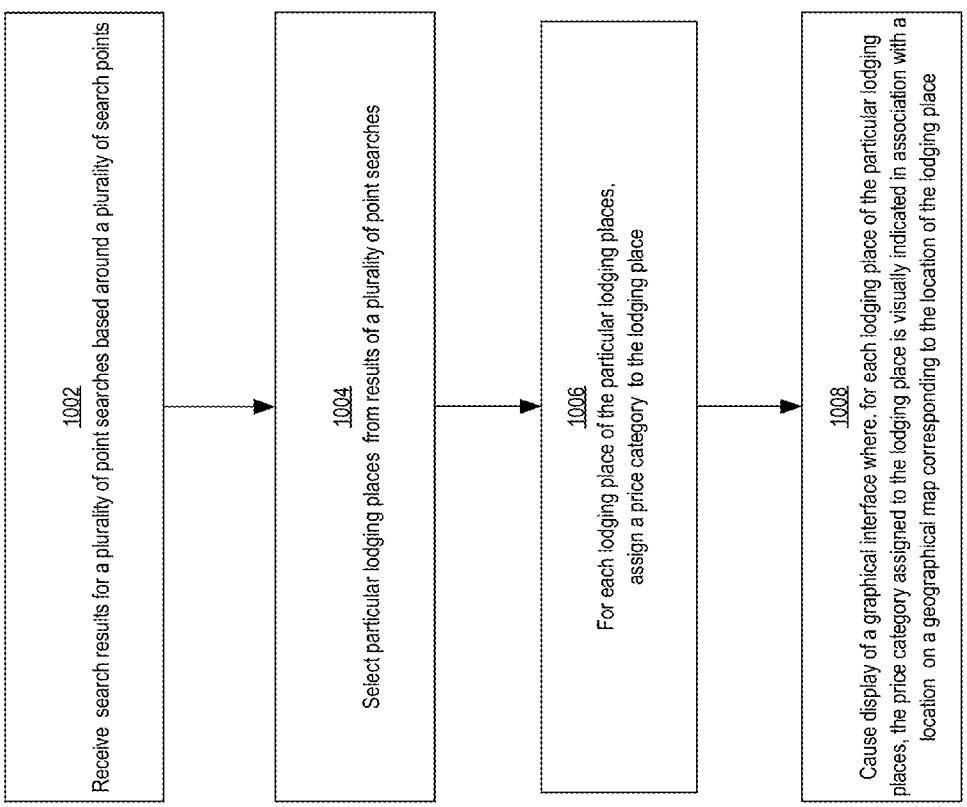
FIG. 10 illustrates an example process for causing display of search result information indicating price categories of various lodging places along a route.

FIG. 10 illustrates an example process for causing display of search result information indicating price categories of various lodging places along a route. The process of FIG. 10 may be performed at search provider application 108. In another embodiment, the process of FIG. 10, or a portion thereof, may be performed at search provider server 122.

At block 1002, search provider application 108 receives search results for a plurality of point searches based upon a plurality of search points. Search provider application 108 may select search points around which to request performance of point searches according to the techniques described herein, such as the technique described with respect to block 206.

In an embodiment, the graphical interface of FIG. 9 is determined based on search results from a large number of point searches, with each point search based upon a different search point on the route. For example, search provider application 108 may select a search point for every portion of the route that makes up one percent of the route. If the route is five hundred miles long, application search logic 110 may cause search provider application 108 to select a search point in each five mile portion of the route.

At block 1004, search provider application 108 selects particular lodging places from the various lodging places identified in the received search results. Certain search results may be filtered out according to the techniques described herein, such as based on user preferences or a based on a large proportion of customer reviews being negative.

In some embodiments, for each of the search points, one or more preferred search results are selected from the search results of the point search based on the search point. The preferred search result(s) may be the one or more search results that search provider application 108 determines to be the best match out of the filtered set of search results associated with search point 318 based on the user's preferences. In other embodiments, the preferred search result(s) may be selected based on other techniques described herein. Search provider application 108 may only display search result information for the preferred search results and not the remaining search results included in the sets of search results.

At block 1006, for each lodging place of the particular lodging places, search provider application 108 assigns a price category to the lodging place. In an embodiment, each lodging place is categorized as inexpensive, moderately expensive, or expensive based on a comparison of the nightly rate of the lodging place and the threshold rates associated with each of the price categories. In some embodiments, the nightly rate of the lodging place is the nightly rate for staying at the lodging place in addition to the nightly rate for parking at the lodging place. In other embodiments, the nightly rate of the lodging place is only based on the nightly rate for staying at the lodging place.

The thresholds rates may be specified in search settings 132 or user data 136 and may not be dependent on any particular search results. In other embodiments, the threshold rates are determined based on the nightly rates of a portion or all of the lodging places in the search results. For example, search provider application 108 may determine threshold rates for each category such that approximately one-third of the particular lodging places may have rates below the first threshold rate, another approximately one-third of the particular lodging places may have rates between the second and third thresholds, and another approximately one-third of the particular lodging places may have rates above the third threshold. In other embodiments, there may be different numbers of price categories and/or the threshold rates may be determined in different ways, such as based on a deviation from a median price. Search provider application 108 may consider the nightly rate of a lodging place as the nightly rate of a room in the lodging place in addition to the nightly rate for parking overnight at the lodging place.

At block 1008, search provider application 108 causes display of a graphical depiction of a route upon a map where, for each lodging place of the particular lodging places, the price category assigned to the lodging place is visually indicated in association with a location on a geographical map corresponding to the location of the lodging place.

In on embodiment, the price category of a lodging place is visually indicated by the color of the annotation corresponding to the lodging place. For example, the location of annotation 902 may correspond to a location of particular lodging place. The purple color of annotation 902 may indicate that the particular lodging place is moderately expensive.

In another embodiment, the price category of a lodging place may be visually indicated by other features of the annotation. For example, the size of the annotation corresponding to a lodging place may indicate the price category of the lodging place. The inexpensive places of lodging may be represented by larger annotations than the expensive places of lodging. In other embodiments, the shape or symbol of the annotation may indicate the price category of the lodging place that corresponds to the annotation. Such visual indications may enable a price-discriminating user to easily select a lodging place on the route.

According to various embodiments, one or more of the steps of the processes illustrated in FIGS. 2, 4, 8, 10 may be removed or the ordering of the steps may be changed.

2.2.3 Recommending Lodging Places Based on a Preferred Check-in Time

Figure 11:
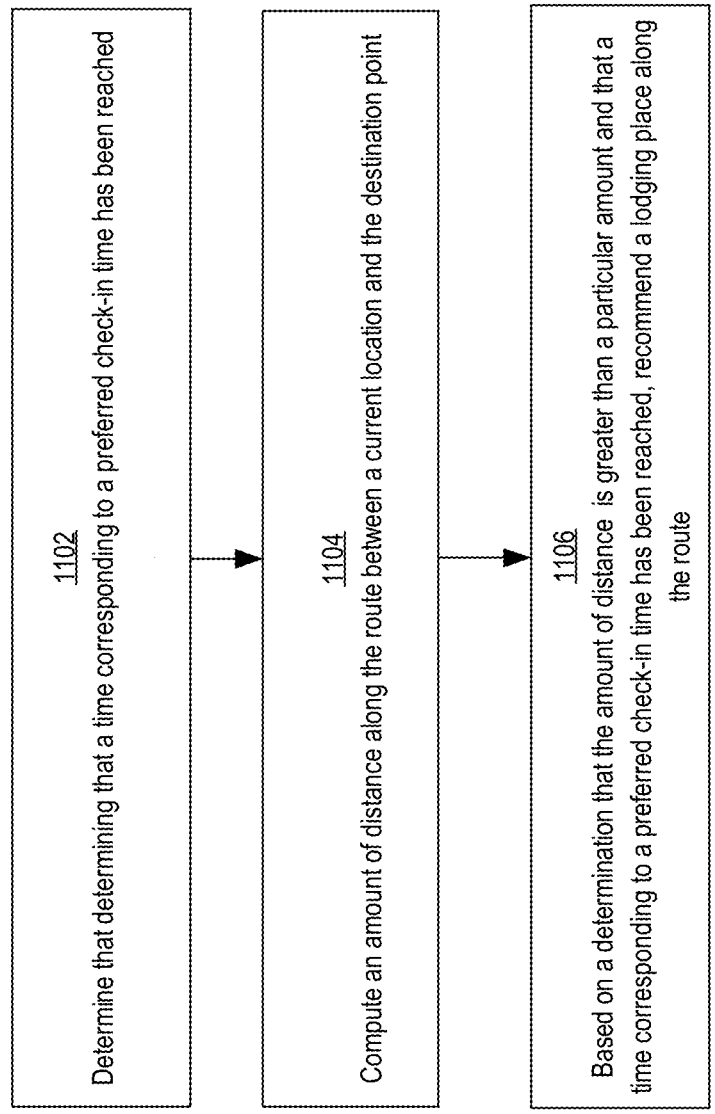
FIG. 11 illustrates an example process for recommending a lodging place based on a preferred check-in time.
Figure 12:
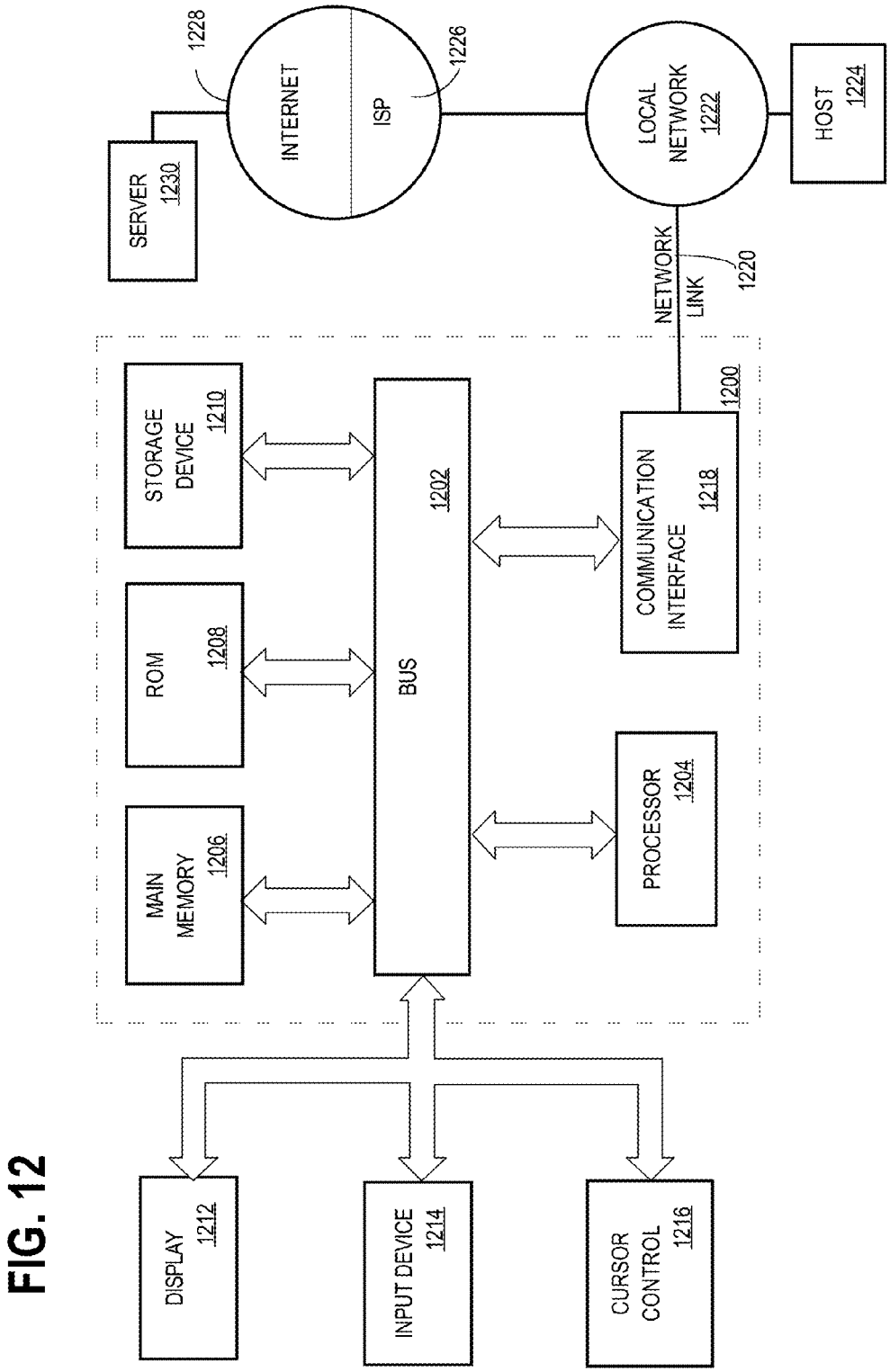
FIG. 12 is a block diagram that illustrates a computer system upon which an embodiment of the invention may be implemented.

In some embodiments, at least some lodging places may be recommended based on a preferred check-in time. FIG. 11 illustrates an example process for recommending a lodging place based on a preferred check-in time. The process of FIG. 11 may be performed at search provider application 108. At block 1102, search provider application 108 determines that a time corresponding to a preferred check-in time has been reached. The preferred check-in time may be a default time or a time provided by the user. The time corresponding to the preferred check-in time may be the preferred check-in time itself or some other time, such as fifteen minutes before the preferred check-in time.

The time corresponding to the preferred check-in time may be reached while a user associated with client navigation device 102 travels along a route of journey from a starting point to a destination point. The starting and destination point may have been specified by the user.

At block 1104, search provider application 108 computes an amount of distance along the route between a current location and the destination point. The current location may be the location of client navigation device 102 at the time corresponding to the preferred check-in time.

At block 1106, search provide application 108 recommends a lodging place along the route based on a determination that the amount of distance is greater than a particular amount and that a time corresponding to a preferred check-in time has been reached.

In response to determining that that the amount of distance is greater than a particular amount and that a time corresponding to a preferred check-in time has been reached, search provider application 108 may recommend a lodging place near a particular location. According to various embodiments, the particular location may be the current location or another location a certain amount of distance after the current location along the route. Search provider application 108 may initiate a point search around the particular location and may select one or more lodging places to recommend from the resulting search result based on user preferences and/or availability.

Recommending a lodging place may comprise causing display of information relating to one or more lodging places near the current location. In some embodiments, the information relating to the one or more lodging places may comprise one or more options and, when an option is selected, search provider application 108 may cause a stay at the corresponding lodging place to be reserved.

If the amount of distance along the route between the current location and the destination point is less than a threshold amount, search provider application 108 may not recommend a lodging place near the current location.

According to various embodiments, one or more of the steps of the processes illustrated in FIGS. 2, 4, 8, 10 and, 11 may be removed or the ordering of the steps may be changed.

Additionally, although separate embodiments are discussed herein, any combination of embodiments and/or partial embodiments discussed herein may be combined to form further embodiments.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine.

According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
  determining, using a computer, a starting point and a destination point;
  determining, using the computer, a route of a journey by a mode of transportation from the starting point to the destination point;
  selecting a plurality of search points that are spaced apart and on the route;
  causing performance of a plurality of point searches, wherein each point search of the plurality of point searches is associated with a search point of the plurality of search points and is a search for places of lodging that are near the search point;
  receiving, using the computer, search results of two or more of the plurality of point searches and identifying two or more places of lodging located along the route;
  determining that a point search based upon a particular search point resulted in greater than a particular threshold number of lodging places, wherein the particular threshold number is greater than 0;

selecting the particular search point for inclusion in a set of search points that is a subset of the plurality of search points based on the determining that the point search resulted in greater than the particular threshold number of lodging places;

selecting search result information corresponding to the particular search point for display based on a determination that the particular search point belongs to the set of search points;

causing display of the search result information in association with route information relating to the route.

2. The computer-implemented method of claim 1, wherein selecting the plurality of search points on the route comprises:
selecting a certain search point based on a predetermined route segment length and one or more of:
a distance of the certain search point from another point on the route; or
an amount of time that is estimated to elapse while traveling on the route before the certain search point is reached from the another point on the route;
wherein the predetermined route segment length indicates any of an amount of time or distance to be traveled per route segment.

3. The computer-implemented method of claim 1, selecting the plurality of search points on the route comprises:
selecting the particular search point by comparing an estimated time at which the particular search point is estimated to be reached and a preferred stop time determined prior to determining the route.

4. The computer-implemented method of claim 1, wherein selecting the plurality of search points comprises selecting a certain search point based on a navigation direction associated with the certain search point.

5. The computer-implemented method of claim 1, wherein selecting the plurality of search points on the route comprises:
determining that a particular attraction of a plurality of attractions is within a threshold distance from a particular point on the route;
selecting the particular point on the route based on the determination that the particular attraction is within the threshold distance from the particular point on the route.

6. The computer-implemented method of claim 1, wherein causing display of the search result information in association with the route information relating to the route comprises:
causing display of a graphical depiction of the route upon a geographical map with certain search points emphasized, wherein a search point of the certain search points is annotated with certain search result information relating to a point search associated with the search point.

7. The computer-implemented method of claim 1, wherein causing display of the search result information in association with the route information comprises:
causing display of a result display item between two navigation directions, wherein the result display item comprises information describing at least one lodging place included as a search result of at least one point search of the plurality of point searches.

8. The computer-implemented method of claim 7, wherein the result display item represents a single search point.

9. The computer-implemented method of claim 8, wherein the result display item represents a group of search points, the method further comprising:

determining that the result display item is selected;
causing display of additional result display items, wherein each result display item of the additional result display items represents a corresponding search point of the group of search points.

10. The computer-implemented method of claim 1, further comprising:
selecting particular lodging places from results of the plurality of point searches;
assigning, for each lodging place of the particular lodging places, a price category to the lodging place;
causing display of a graphical depiction of the route upon a map wherein, for each lodging place of the particular lodging places, the price category assigned to the lodging place is visually indicated in association with a location on a geographical map corresponding to the location of the lodging place.

11. The computer-implemented method of claim 1, wherein the mode of transportation is any of driving and public transportation.

12. A computer-implemented method comprising:
determining a starting point and a destination point;
determining a route of a journey by a mode of transportation from the starting point to the destination point;
determining that a time corresponding to a preferred check-in time has been reached;
determining an amount of distance along the route between a current location at the time corresponding to the preferred check-in time and the destination point;
based on a determination that the amount of distance is greater than a particular amount and that a time corresponding to a preferred check-in time has been reached, recommending a lodging place along the route;
wherein the computer-implemented method is performed by one or more computing devices.

13. The computer-implemented method of claim 12, wherein the time corresponding to the preferred check-in time is the preferred check-in time.

14. One or more non-transitory storage media storing instructions which, when executed by one or more computing devices, cause:
determining, using a computer, a starting point and a destination point;
determining, using the computer, a route of a journey by a mode of transportation from the starting point to the destination point;
selecting a plurality of search points that are spaced apart and on the route;
causing performance of a plurality of point searches, wherein each point search of the plurality of point searches is associated with a search point of the plurality of search points and is a search for places of lodging that are near the search point;
receiving, using the computer, search results of two or more of the plurality of point searches and identifying two or more places of lodging located along the route;
determining that a point search based upon a particular search point resulted in greater than a particular threshold number of lodging places, wherein the particular threshold number is greater than 0;
selecting the particular search point for inclusion in a set of search points that is a subset of the plurality of search points based on the determining that the point search resulted in greater than the particular threshold number of lodging places;

selecting search result information corresponding to the particular search point for display based on a determination that the particular search point belongs to the set of search points;

causing display of the search result information in association with route information relating to the route.

15. The non-transitory storage media of claim 14, wherein selecting the plurality of search points on the route comprises:

selecting a certain search point based on a predetermined route segment length and one or more of:

a distance of the certain search point from another point on the route; or an amount of time that is estimated to elapse while traveling on the route before the certain search point is reached from the another point on the route;

wherein the predetermined route segment length indicates any of an amount of time or distance to be traveled per route segment.

16. The non-transitory storage media of claim 14, wherein selecting the plurality of search points on the route comprises:

selecting the particular search point by comparing an estimated time at which the particular search point is estimated to be reached and a preferred stop time determined prior to determining the route.

17. The non-transitory storage media of claim 14, wherein selecting the plurality of search points comprises selecting a certain search point based on a navigation direction associated with the certain search point.

18. The non-transitory storage media of claim 14, wherein selecting the plurality of search points on the route comprises:

determining that a particular attraction of a plurality of attractions is within a threshold distance from a particular point on the route;

selecting the particular point on the route based on the determination that the particular attraction is within the threshold distance from the particular point on the route.

19. The non-transitory storage media of claim 14, wherein causing display of the search result information in association with the route information relating to the route comprises:

causing display of a graphical depiction of the route upon a geographical map with certain search points emphasized, wherein a search point of the certain search points is annotated with certain search result information relating to a point search associated with the search point.

20. The non-transitory storage media of claim 14, wherein causing display of the search result information in association with the route information comprises:

causing display of a result display item between two navigation directions, wherein the result display item comprises information describing at least one lodging place included as a search result of at least one point search of the plurality of point searches.

21. The non-transitory storage media of claim 20, wherein the result display item represents a single search point.

22. The non-transitory storage media of claim 20, wherein the result display item represents a group of search points, the method further comprising:

determining that the result display item is selected;

causing display of additional result display items, wherein each result display item of the additional result display items represents a corresponding search point of the group of search points.

23. The non-transitory storage media of claim 14 which, when executed by one or more computing devices, further causes:

selecting particular lodging places from results of the plurality of point searches;

assigning, for each lodging place of the particular lodging places, a price category to the lodging place;

causing display of a graphical depiction of the route upon a map wherein, for each lodging place of the particular lodging places, the price category assigned to the lodging place is visually indicated in association with a location on a geographical map corresponding to the location of the lodging place.

24. The non-transitory storage media of claim 14, wherein the mode of transportation is any of driving and public transportation.

25. One or more non-transitory storage media storing instructions which, when executed by one or more computing devices, cause:

determining a starting point and a destination point;

determining a route of a journey by a mode of transportation from the starting point to the destination point;

determining that a time corresponding to a preferred check-in time has been reached;

determining an amount of distance along the route between a current location at the time corresponding to the preferred check-in time and the destination point;

based on a determination that the amount of distance is greater than a particular amount and that a time corresponding to a preferred check-in time has been reached, recommending a lodging place along the route;

wherein the computer-implemented method is performed by one or more computing devices.

26. The one or more non-transitory storage media of claim 25, wherein the time corresponding to the preferred check-in time is the preferred check-in time.

* * * * *